United States Patent
Kowalk et al.

(10) Patent No.: US 12,400,653 B2
(45) Date of Patent: Aug. 26, 2025

(54) DIGITAL INTERFACE WITH USER INPUT GUIDANCE

(71) Applicant: MagicX Inc., Burlingame, CA (US)

(72) Inventors: Bradley Kowalk, San Francisco, CA (US); Seung Woo Lee, Belmont, CA (US)

(73) Assignee: MAGICX Inc., Burlingame, CA (US)

( * ) Notice: Subject to any disclaimer, the term of this patent is extended or adjusted under 35 U.S.C. 154(b) by 325 days.

(21) Appl. No.: 18/329,030

(22) Filed: Jun. 5, 2023

(65) Prior Publication Data
US 2023/0402037 A1   Dec. 14, 2023

Related U.S. Application Data

(60) Provisional application No. 63/350,416, filed on Jun. 9, 2022.

(51) Int. Cl.
*G10L 15/22*   (2006.01)
*G06F 3/0482*   (2013.01)
(Continued)

(52) U.S. Cl.
CPC ............ *G10L 15/22* (2013.01); *G06F 3/0482* (2013.01); *G06F 3/167* (2013.01); *G10L 15/18* (2013.01);
(Continued)

(58) Field of Classification Search
USPC ...................................................... 704/1–504
See application file for complete search history.

(56) References Cited

U.S. PATENT DOCUMENTS 9,043,206 B2 * 5/2015 Roberge .................. G10L 15/08
  704/251
10,318,572 B2 * 6/2019 Kulesza .............. G06F 3/04817
(Continued)

FOREIGN PATENT DOCUMENTS

WO   WO-2021025668 A1 *  2/2021   ............. G06N 20/00
WO   WO-2021257219 A1 * 12/2021   ......... G06F 3/04842
WO   WO-2023239638 A1 * 12/2023   ............. G10L 15/22

OTHER PUBLICATIONS

PCT International Search Report and Written Opinion, PCT Application No. PCT/US2023/024422, Sep. 20, 2023, nine pages.

*Primary Examiner* — Marcus T Riley
(74) *Attorney, Agent, or Firm* — Fenwick & West LLP (57) ABSTRACT

The disclosure provides a digital interface with a user guidance interface. The digital interface receives a voice command from a user via a client device and identifies an action associated with the voice command. The digital interface may access a set of command categories associated with the identified action, with each command category representing a characteristic of the identified action. The digital interface may generate an interface for display on the client device to include the first user input and a set of placeholder text identifying each of the command categories, and may receive a subsequent user input corresponding to one or more of the set of command categories. Based on the subsequent user input, the digital interface may modify placeholder text corresponding to the one or more of the set of command categories and enable the client device to perform the identified action based at least on the modified placeholder text.

20 Claims, 8 Drawing Sheets

(51) Int. Cl.
*G06F 3/16* (2006.01)
*G10L 15/18* (2013.01)
*G10L 15/30* (2013.01)

(52) U.S. Cl.
CPC ........ *G10L 15/30* (2013.01); *G10L 2015/223* (2013.01)

(56) References Cited

U.S. PATENT DOCUMENTS

| | | | |
|---|---|---|---|
| 10,332,513 B1* | 6/2019 | D'Souza | G10L 15/22 |
| 10,594,757 B1* | 3/2020 | Shevchenko | H04N 7/148 |
| 10,803,869 B2* | 10/2020 | D'Souza | H04M 3/42204 |
| 10,978,056 B1* | 4/2021 | Challa | G06N 5/025 |
| 11,688,022 B2* | 6/2023 | Aghajanyan | G06Q 30/0643 |
| | | | 704/9 |
| 11,887,590 B2* | 1/2024 | D'Souza | H04M 3/42204 |
| 11,966,701 B2* | 4/2024 | Pu | G06T 19/20 |
| 2014/0052444 A1* | 2/2014 | Roberge | G10L 15/08 |
| | | | 704/243 |
| 2015/0082218 A1* | 3/2015 | Affoneh | G06F 9/451 |
| | | | 715/771 |
| 2017/0026318 A1* | 1/2017 | Daniel | H04L 51/046 |
| 2018/0336010 A1* | 11/2018 | Mukherjee | H04L 67/141 |
| 2019/0102482 A1* | 4/2019 | Ni | G06N 3/084 |
| 2019/0371329 A1* | 12/2019 | D'Souza | G10L 15/22 |
| 2021/0104238 A1* | 4/2021 | D'Souza | G06F 3/167 |
| 2021/0117624 A1* | 4/2021 | Aghajanyan | G06F 40/56 |
| 2023/0402037 A1* | 12/2023 | Kowalk | G10L 15/30 |
| 2025/0166665 A1* | 5/2025 | Lew | G06T 11/60 |

* cited by examiner

DIGITAL INTERFACE WITH USER INPUT GUIDANCE

CROSS-REFERENCE TO RELATED APPLICATIONS

This application claims a benefit of U.S. Provisional Application No. 63/350,416, filed Jun. 9, 2022, all of which is incorporated by reference herein in their entirety.

TECHNICAL FIELD

The disclosure generally relates to the field of digital interface, and more generally, to a digital interface with user input guidance.

BACKGROUND

Computer assistants such as smart speakers and artificial intelligence programs are growing in popularity and in use in various user-facing systems. The computerized systems can often be implemented such that an entire process is automated without the human user of the system having any insight into the process. For example, a computer can complete a set of tasks without the need to display content to a screen for the user. However, many users prefer to receive feedback about a computerized process, and it is useful and necessary for a user to understand the state of a set of tasks if the user is needed to provide feedback at a particular step.

Conventional digital interfaces largely do not actively guide users in what to say in real-time apart from basic word autocompletion. This results in a large gap in expectations between what a user thinks they can or should say, and what inputs the system needs to accomplish a task.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed are systems (as well as methods and computer program code stored on non-transitory computer readable mediums) configured to provide a digital interface with user guidance, which is capable of empowering users to i) know what they have said and/or what has been reorganized by the system; ii) know what they still need to input/say, e.g., parameters required by the system to complete a task; and iii) know what they can input/say, e.g., options for each parameter and optional parameters. In one embodiment, a digital interface receives a voice command from a client device and identifies an action associated with the voice command. The digital interface may access a set of command categories associated with the identified action, where each command category represents a characteristic of the identified action. The digital interface may generate an interface for display on the client device to include the first user input and a set of placeholder text identifying each of the command categories, and may receive a subsequent user input corresponding to one or more of the set of command categories. The digital interface may modify placeholder text corresponding to the one or more of the set of command categories with text corresponding to the subsequent user input, and can enable the client device to perform the identified action based at least on the modified placeholder text.

The digital interface described herein guides a user with what to say in real-time, with a continuously reinforcing framework (loop) of education and feedback techniques including, but not limited to, (i) guiding text and visuals, (ii) speech recognition/transcription, and (iii) speech understanding. In this way, the digital interface receives an entire set of instructions from the user before performing the action required by the user so that the digital interface does not perform an inapplicable or incomplete task for the user, resulting in i) fewer back and forth clarifying questions, and ultimately ii) a higher success rate.

Example System Configuration

Figure 1:
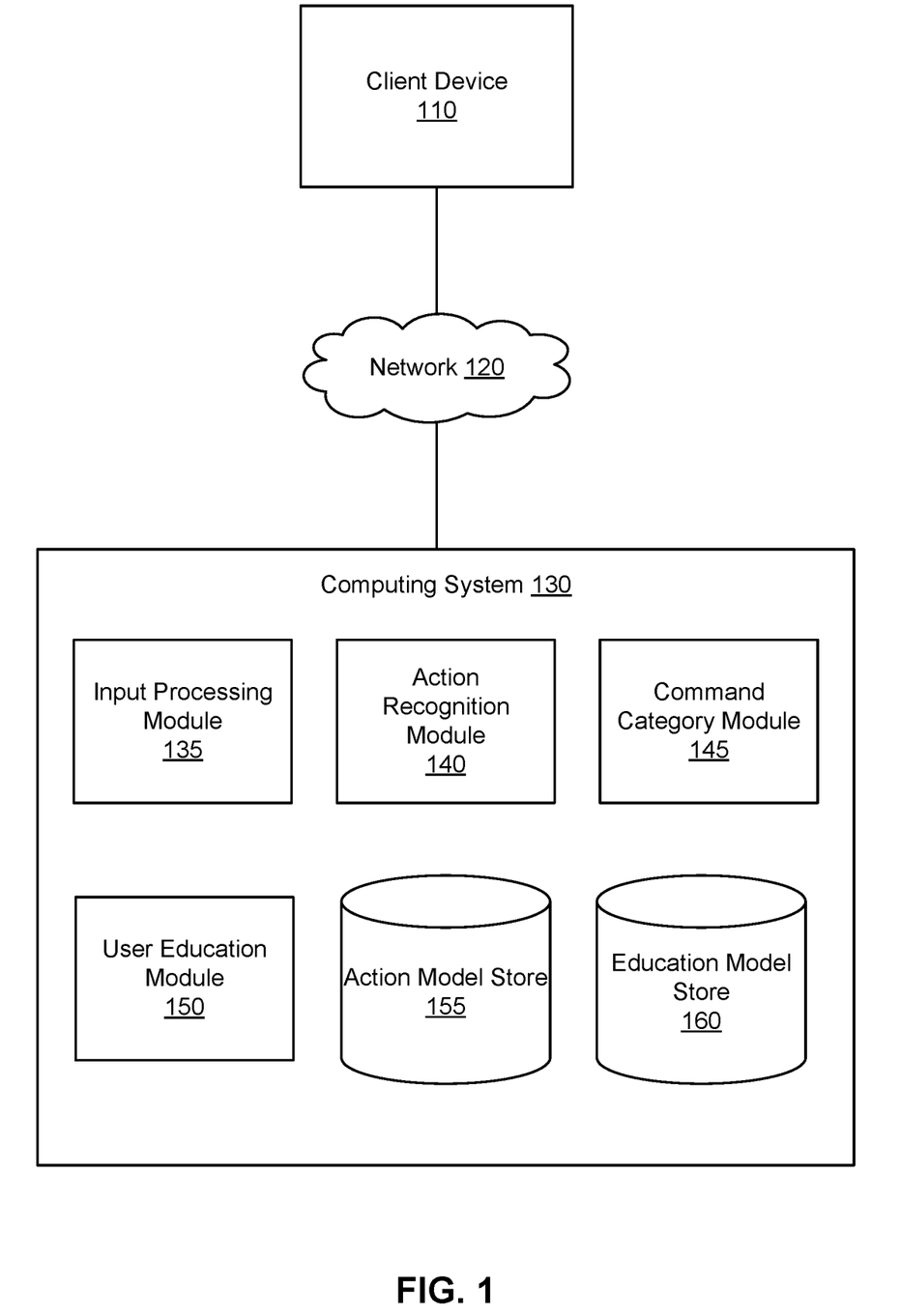
FIG. 1 is a high-level block diagram of a system architecture for a computing system, in accordance with an example embodiment.

Figure (FIG. 1 is a block diagram of a system architecture for a computing system, in accordance with an example embodiment. FIG. 1 includes a computing system 130, a network 120, and a client device 110. For clarity, only one client device and one computing system 130 is shown in FIG. 1. Alternate embodiments of the system environment can have any number of client devices 110 as well as multiple computing systems 130. The functions performed by the various entities of FIG. 1 may vary in different embodiments. The client device 110 and the computing system 130 may include some or all of the components of the example computing device described with FIG. 5, and likewise may include a corresponding operating system.

In an example embodiment, the computing system 130 generates (or renders or enables for rendering) a user interface for display to a user in response to user input (e.g., a typed or spoken text string). For example, the user input may include a voice command and/or text input, indicating an action to be performed by a digital interface. It should be noted that although the examples described herein are limited to voice commands, in practice the principles described herein apply equally to text inputs or any other natural language input. In some embodiments, the system may also receive visual input, e.g., from a camera or camera roll of a client device 110, to effectuate a search process on an online marketplace. The computing system 130 identifies an action associated with the user input. In some embodiments, the action corresponds to a machine (e.g., computer or computing system) prediction of what may be intended by a user based upon received user input. The action may be a computer executable function or request that corresponds to, and/or is described by, the received user input. The executable function may be instantiated by generating and/or populating (e.g., in a rendering) one or more user interfaces for the function that may be executed and that corresponds to what may be the identified action.

A user may enter a user input via a client device 110. Client devices 110 can be any personal or mobile computing devices such as smartphones, tablets, notebook computers, laptops, desktop computers, and smartwatches as well as any home entertainment device such as televisions, video game consoles, television boxes, and receivers. The client device 110 can present information received from the computing system 130 to a user, for example in the form of user interfaces. In some embodiments, the computing system 130 may be stored and executed from the same machine as the client device 110.

The client device 110 can communicate with the computing system 130 via the network 120. The network 120 may comprise any combination of local area and wide area networks employing wired or wireless communication links. In some embodiments, all or some of the communication of the network 120 may be encrypted.

The computing system 130 includes various modules and data stores to determine actions and the corresponding command categories, and/or generate interfaces. The computing system 130 comprises an input processing module 135, an action recognition module 140, a command category module 145, a user education module, an action model store 155, and an education model store 160. Computer components such as web servers, network interfaces, security functions, load balancers, failover servers, management and network operations consoles, and the like are not shown so as to not obscure the details of the system architecture. Additionally, the computing system 130 may contain more, fewer, or different components than those shown in FIG. 1 and the functionality of the components as described herein may be distributed differently from the description herein. It is noted that the module and modules may be embodied as program code (e.g., software or firmware), hardware (e.g., application specific integrated circuit (ASIC), field programmable gate array (FPGA), controller, processor) or a combination thereof.

The input processing module 135 receives user input, e.g., in the form of audio, and processes user input to generate signals that the computing system 130 can use for action recognition and for identifying command categories. In some embodiments, the input processing module 135 applies automatic speech recognition or other type of speech models to produce an input string that represents the input, e.g., as text. In one implementation, the input processing module 135 performs a natural language processing (NLP) operation on the received user input, for example, performing tokenization, part-of-speech tagging, stemming, lemmatization, stopword identification, dependency parsing, entity extraction, chunking, semantic role labeling, and coreference resolution. In one embodiment, the input to the input processing module 135 is a voice command including one or more words, for example, in the form of a complete or partially complete sentence or phrase. In some embodiments, the input processing module 135 constructs or looks up numerical representations or feature embeddings for immediate consumption by downstream modules that may use neural networks such as the action recognition module 140 or the command category module 145. For example, the input to the input processing module 135 may be a partial sentence and the output may be the partial sentence with accompanying metadata about the partial sentence.

The action recognition module 140 identifies an action based on the processed user inputs received from the user (via the client device 110). In particular, the action recognition module 140 may identify a function that the computing system 130 can perform. The action corresponds to the set of words identified from the processed user input. The user input may be matched to one or more pre-defined actions. For ease of discussion, the system is described in the context of words included in a voice command. However, it is noted that the principles described herein also may apply to any set of signals, which may include text input, sounds actions (e.g., audio tones), video streams (e.g., in ambient computing scenarios), and other potential forms of informational input. In different embodiments, the action recognition module 140 may use various machine learning models for determining an action that can be associated with the user input. For ease of description, the system will be described in the context of supervised machine learning. However, it is noted that the principles described herein also may apply to semi-supervised and unsupervised systems.

In one example embodiment, the action recognition module 140 may directly extract one or more words included in the processed user input for identifying the action, for example, "schedule," "order," "invite," etc. In some embodiments, the action recognition module 140 uses text classification to identify an action that is most likely to correspond to the user input. In this example embodiment, an action model may be trained using labeled examples of input strings. For example, the computing system 130 may store labeled example input strings. The labels associate each example input string with one of the actions. The training data may include example input strings in the form of words, partial sentences, partial phrases, complete sentences, and complete phrases. The action model may also be trained to use the various natural language processing signals produced by the input processing module 135 and the training data may additionally include natural language processing signals.

In some embodiments, the action recognition module 140 may identify an action based on user history (e.g., previous user actions). For example, a user speaks "add . . . " in a voice command via the client device 110, the corresponding action may be "add a meeting schedule to the calendar," or "add a product in a shopping list in the reminder, etc." The action recognition module 140 may access data associated with the user's usage history and find that the user frequently uses the "calendar" function to schedule meetings but seldomly uses the "reminder" function to keep a shopping list. In this case, the action recognition module 140 may identify "add a meeting schedule to the calendar" as the action corresponding to the user input.

The computing system 130 includes a command category module 145, which provides a set of command categories associated with the identified action. Each of the command categories may represent a characteristic of the identified action. For example, an identified action may be "scheduling an appointment," and the associated command categories may include action parameters, such as, "title" (e.g., what appointment is about), "who" (e.g., the attendees in the appointment), "when" (e.g., the time to be schedule), "where" (e.g., the location of the appointment), etc. In another example, the identified action may be "ordering a pizza," and the associated command categories may include action parameters, such as, "size," "toppings," "sauce," "restaurant," "when" (e.g., delivery time or ordering time), "drinks," etc. In some embodiments, the set of command categories may include required command categories and optional command categories. The required command categories may correspond to action parameters required to perform the action, and the optional command categories may correspond to action parameters related to user preferences, recommendations, etc. Take the action of "ordering a pizza" as an example, the action parameter "toppings" is likely to be a required command category for ordering a pizza, whereas the action parameter "drinks" may be optional. In some embodiments, whether a command category is required or optional may be determined based on user preference, usage history, user statistics, recommendations, etc.

In various embodiments, the command category module 145 accepts the processed user input (e.g., the associated NLP signals) from the input processing module 135, and the identified action from the action recognition module 140 as input. The command category module 145 may also access the action module store 155 and the education model store 160 to use the interface associated with the identified action as an input, thus obtaining the set of command categories that will be needed for the computing system 130 to perform the action. In some embodiments, one or more associated command categories may be extracted from the set of words identified from the processed user input. The extracted words may be associated with one or more pre-defined command categories. For instance, the user may request to "order a pepperoni pizza." In this case, the action parameter "toppings" is provided and identified from the user input and determined as the command category.

In some embodiments, the command category module 145 uses an action model to provide a set of command categories that are associated with the identified action. In an example embodiment, the action model may be trained using labeled examples of command categories. The labels associate each example command category with one of the actions. The action model may output a set of command categories that are most likely to be associated with an identified action. In some embodiments, the command category module 145 may identify the command categories for a given action based on user history, such as previous user actions. In particular, one or more optional command categories may be included or removed from the set of command categories associated with an action. For example, assuming a user seldomly orders drinks with pizza, the command category module 145 may determine that the set of command categories associated with "ordering a pizza" action does not include an action parameter "drinks" as a command category for this user. Similarly, the user may often order pizza with extra cheese, and the command category module 145 may add the action parameter "cheese options" in the set of command categories associated with "ordering a pizza" action.

The computing system 130 includes a user education module 150. The user education module 150 may generate an interface for display on the client device 110. The displayed interface may include the user input and a set of placeholder text identifying each of the command categories associated with the identified action. The interface may be displayed to the user as a response to the user input, presenting the received user input and the identified action to the user for review. The set of placeholder text corresponding to the command categories provides a guidance to the user on the characteristics of the identified action so that the user learns whether/what additional user input is needed to perform the action. For example, a user orders a pepperoni pizza, but does not specify a size of the pizza in the voice command. The user education module 150 may generate an interface presenting the user's order with a placeholder text identifying the action parameter of "size" so that the user notices the missing information and inputs the size of pizza in the subsequent input. In some embodiments, the placeholder text may be a generic name of an action parameter, such as, "toppings," "time," "size," etc. Alternatively, the placeholder text may be suggestive text corresponding to the command category, such as, "pepperoni," "8 pm," "10 inches," etc. For ease of discussion, the placeholder text is described in the context of words. However, it is noted that the principles described herein also may apply to any user guidance, which may include images, logos, URLs, and other potential forms of informational output.

In some embodiments, the user education module 150 may present one or more sets of placeholder text including suggestive text in the interface. In one example, for the command category of "toppings," the user education module 150 may include suggestive text, such as, "pepperoni," "mushroom," "spinach," as the placeholder text displaced to the user. In some embodiments, suggestive text for one or more command categories may be displayed in a separate interface portion for selected by a user. In some embodiments, one or more command categories are required for performing the identified action, and some command categories are optional. Similarly, in some embodiments, some placeholder text is required, and some other placeholder text is optional; and in some other embodiments, one or more placeholder text may be selected for the same command category.

Based on the guidance from the displayed interface, the user may add, remove, modify, and/or select any of the placeholder text for each of the corresponding command categories so that the user may refine and customize the identified action for performance. The user education module 150 may extract words from the processed user input as the corresponding placeholder text. For example, the user education module 150 may use "pepperoni" from the user input "order a pepperoni pizza" as the placeholder text corresponding to the command category of "toppings." In some embodiments, the user education module 150 may apply a machine learned model to extract a set of words from the processed user input and to associate the extracted words with the command categories.

The user education module 150 may also access the education model store 160 to obtain a set of placeholder text that corresponds to the identified action and the set of command categories. In one implementation, the user education module 150 may select the corresponding placeholder text based on user history (e.g., previous user actions). For instance, the user often orders a 10-inch pizza, and the user education module 150 may select "10-inch" as the placeholder text corresponding to the command category of "size" and present it in the interface for the user to review. In some embodiments, the user education module 150 may apply a machine-learned model to determine placeholder text that is most likely to inform a user about what to say to provide information required for the command category. For instance, the machine-learned model may determine that including the placeholder text "size" in the "pizza size" command category is the most likely placeholder text to get a user to speak a pizza size, whereas in other embodiments, the placeholder text "12 inches" is the most likely placeholder text to get a user to speak a pizza size.

In another implementation, the user education module 150 may use placeholder text to provide recommendations to the user. For example, although the user has requested to order a pepperoni pizza, the user education module 150 may still include suggestive text, such as, "sausage," "mushroom," etc. as options to the user. In some embodiments, the user education module 150 may also select the placeholder text based on user preference, user statistics, etc.

The action model store 155 stores program code for computer models that are trained and applied by the action recognition module 140 to identify an action that is most likely to be relevant to a given user input string. In some embodiments, the labeled training data and records of previously matched actions and user inputs may be stored at the action model store 155. The action model store 155 can also store a list of available actions, that is, tasks that the computing system 130 can perform for the user in response to a user input. The action model store 155 also stores the set of command categories associated with each action. The action model store 155 may store program code for computer models that are trained and applied by the action recognition module 140 to obtain the command categories associated with each action. The computer models may be trained with a training dataset that includes commands and actions received from other users. Further, the action model store 155 can store custom actions built and trained by users that are only available for those users.

The education model store 160 stores the models and training data applied by the user education module 150. The education model store 160 also may include the placeholder text based on user preference, user history, user statistics, recommendations, etc. In some embodiments, the education model store 160 stores program code for a user interface for each of the actions that can be performed by the computing system 130. An interface stored by the education model store 160 may include layouts for displaying the interface on a client device 110. In various embodiments, the user interfaces may be interfaces that have been custom made for each potential action. In other embodiments the education model store 160 can contain custom interfaces for custom actions designed by users, and only for use by those users.

Computing System Example

Figure 2:
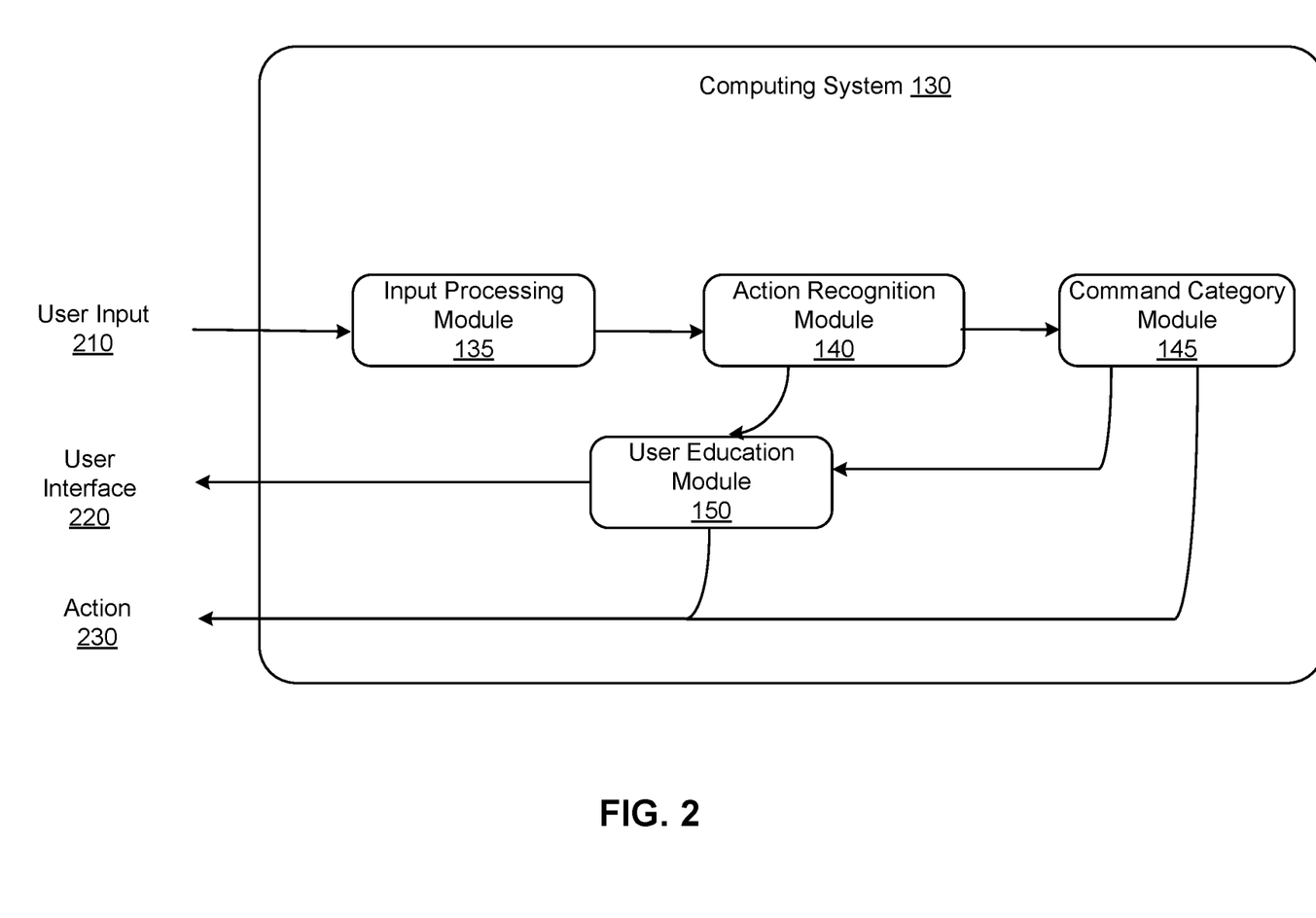
FIG. 2 is a diagram of the interactions between components of the computing system, in accordance with an example embodiment.

FIG. 2 is a diagram of the interactions between components of the computing system 130, in accordance with an example embodiment. The computing system 130 receives a user input 210. The user input may be a complete sentence or concept, or a partial sentence or phrase, expressed by a user, for example, in the form of typed text or spoken audio. The computing system 130 may begin to respond to a user by displaying an interface as the user is still providing input. In some cases, therefore, the user input 210 received by the computing system 130 may be only a first part of the user input, e.g., a word or set of words.

The user input 210 is provided to the input processing module 135, which analyzes the user input 210 and outputs corresponding processed signals, such as NLP signals. The processed signals and the user input 210 are provided to the action recognition module 140. The action recognition module 140 predicts an action that the user intends to perform. The predicted action, processed signals, and user input are provided to the command category module 145, which generates a set of command categories associated with the identified action. The identified action, processed signals, user input, and the set of command categories may be also provided to the user education module 150 to enable the display (on a screen of a computing device, e.g., client device) of a user interface 220. The displayed interface may include the user input and a set of placeholder text identifying each of the command categories associated with the identified action. Upon reviewing the displayed user interface 220, the user may enter subsequent user input to the computing system 130 to modify and/or refine the action and the associated command categories. The computing system 130 may use one or more of the input processing module 135, action recognition module 140, command category module 145, and user education module 150 to further process the subsequent user input. In one example, the subsequent user input may change the identified action, and consequently, the corresponding command categories and placeholder text may also be changed. In another example, the subsequent user input may add, remove, modify, and/or select any of the placeholder text for the corresponding command categories. In another example, the subsequent user input may confirm the identified action and the placeholder text, and the computing system 130 may determine the action is finalized and proceed to perform the action 230. In this way, the user interface 220 to be generated and enabled (or provided) for display on the client device can advantageously begin to change in substantially real-time and provide real-time guidance to the user.

In some embodiments, the components of the computing system 130 may be configured to interact in ways other than that showed in the example of FIG. 2. In one embodiment, the computing system 130 may be configured to include a feedback loop among the action recognition module 140, the command category module 145, and the user education module 150. In other example embodiments, one module may be configured to perform the functions of both the action recognition module 140, the command category module 145 and the user education module 150. In another example embodiment, the computing system may not include an input processing module 135. In such embodiments, the action recognition module 140, the command category module 145, and the user education module 150 may be trained to identify an action and command categories and generate placeholder text based directly on a user input 210.

The following FIGS. 3A through 3D illustrate an example of an interface of a digital interface generating user guidance as user input is received, in accordance with an embodiment. In one embodiment the interface is a user interface presented for display on a screen of a computing device, e.g., a client device 110 such as a smartphone, tablet, wearable device, standalone display, laptop or desktop computer. FIGS. 3A through 3D show an example in which the user input received, e.g., via the client device 110, has been identified as an action (i.e., function or user request) of ordering a pizza. The layouts of the displayed interface change as additional placeholder text corresponding to the command categories associated with the selected interface are determined in response to the receipt of additional user input.

Figure 3A:
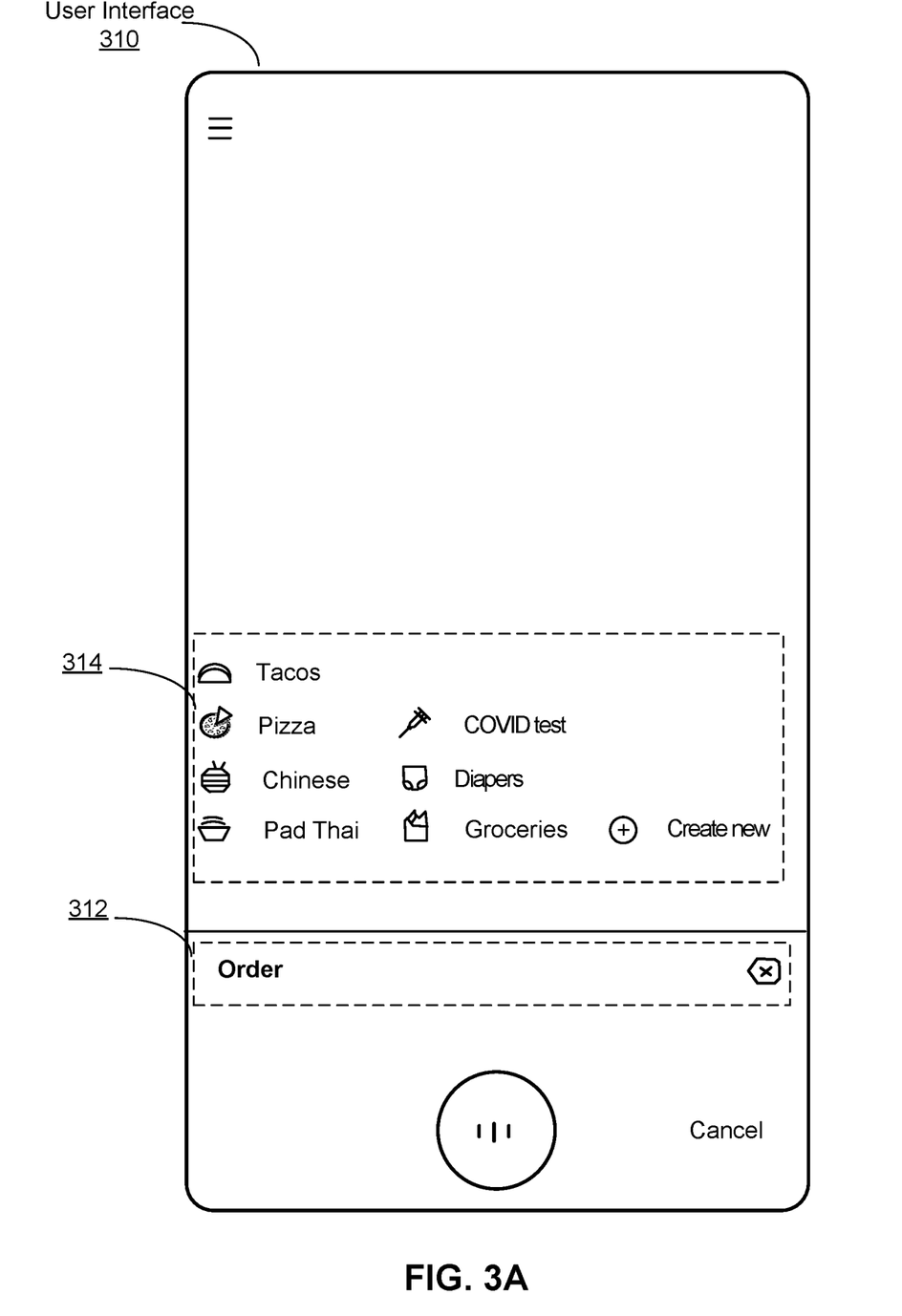
FIG. 3A illustrates a first layout displayed for an interface associated, in accordance with an example embodiment.

FIG. 3A illustrates a first layout displayed for an interface 310 associated with an "order" action, in accordance with an example embodiment. In the example of FIG. 3A, the computing system 130 receives an initial user input that includes the word "order." In some embodiments, the user input may be a voice command, and the computing system 130 processes the voice command and determines an NLP signal that includes the word "order." The computing system 130 determines that the user input is most likely associated with an ordering action. The computing system 130 generates an interface 310 comprising the user input in an interface element 312. In some embodiments, the interface is displayed approximately instantaneously to the user. The interface 310 may include suggestive text in another interface element 314 associated with the user input and the identified action. The suggestive text may be used as guidance and/or recommendation for the user to determine the subsequent user input. In the example of FIG. 3A, the interface 310 includes action items for the identified action, i.e., what to order. As shown in FIG. 3A, the displayed suggestive text includes potential command categories corresponding to "order", e.g., tacos, pizza, diapers, etc. The computing system 130 uses the interface 310 to guide the user for subsequent inputs to refine/modify/specify the action to be performed. The user may select any of the suggestive text, create new action item, continue input additional information, or cancel the action.

Figure 3B:
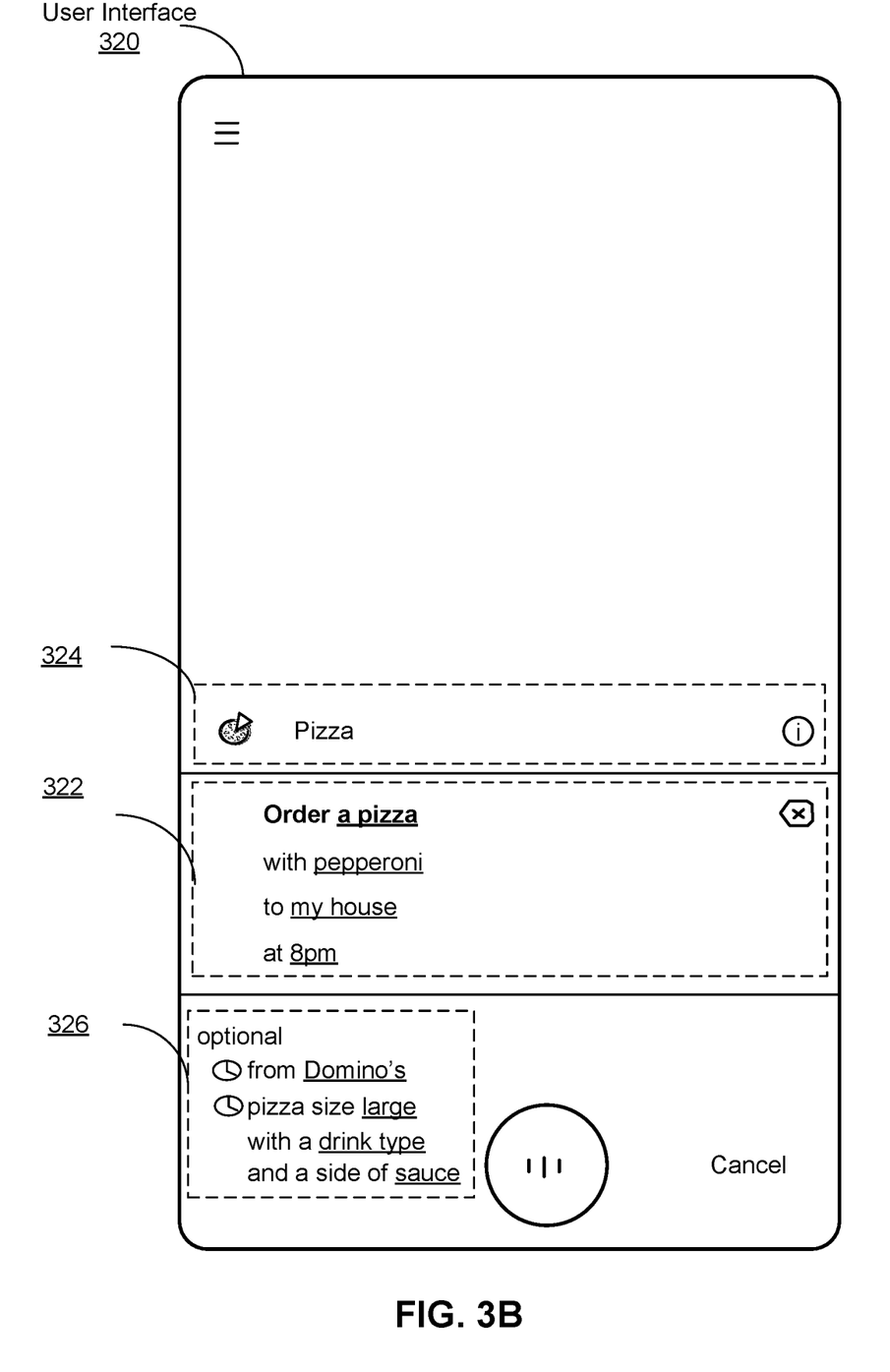
FIG. 3B illustrates a second layout displayed for an interface, in accordance with an example embodiment.

FIG. 3B illustrates a second layout displayed for an interface 320 associated with a pizza-ordering action, in accordance with an example embodiment. In FIG. 3B, the user input includes additional information. In particular, the user has added additional input so that the user input now includes, "Order a pizza". The computing system 130 determines that the selected action is to order a pizza, identifies a set of command categories associated with the action and determines placeholder text corresponding to the command categories. Accordingly, the user interface 310 changes from the layout of FIG. 3A to the layout 320 shown in FIG. 3B. The interface 320 may include an interface element 322 comprising the user input and the placeholder text corresponding to the command categories. For example, the interface element 322 in FIG. 3B includes the user input "order a pizza" and suggestive placeholder text, such as "pepperoni" for the "toppings" command category, "my house" for the "delivery location" command category, and "8 pm" for the "time of delivery" command category. In practice, the interface element 322 can include non-suggestive placeholder text, such as text that identifies the action parameters associated with the "order a pizza" action, for instance "with [toppings]", "to [delivery location]", and "at [delivery time]".

In one implementation, each placeholder text corresponding to each command category may be presented in a separate line, which beneficially allows a user to jump between command categories, to delete a command category, to edit a command category, and the like. In another implementation, the identified action and/or placeholder text that are confirmed by the user may be highlighted in different font, color, bold, etc. In still another implementation, the placeholder text and/or the identified action may be underlined so as to notify the user that the corresponding text is modifiable. In some embodiments, the interface 320 may include an interface element 324 to highlight the identified action to be performed. In some embodiments, the interface 320 may also include another interface element 326 for presenting placeholder text corresponding the optional command categories. For example, the computing system 130 may determine that the optional command categories associated with the pizza-ordering action include action parameters, such as, "restaurant," "size," "drink," and "sauce," etc. Accordingly, the interface 320 presents the suggestive placeholder text, e.g., "Domino's," "large," and action parameters, e.g., "drink type," and "sauce" with the interface element 326. In this way, the interface 320 provides a guidance to the user for subsequent user input to refine/modify/specify the action to be performed. In some embodiments, the computing system 130 may determine the placeholder text using a machine learned model to predict text that is most likely to be input by the user. In some embodiments, the computing system 130 may determine the placeholder text based on user preference, user history (e.g., previous user actions), user statistics, recommendations, etc.

Figure 3C:
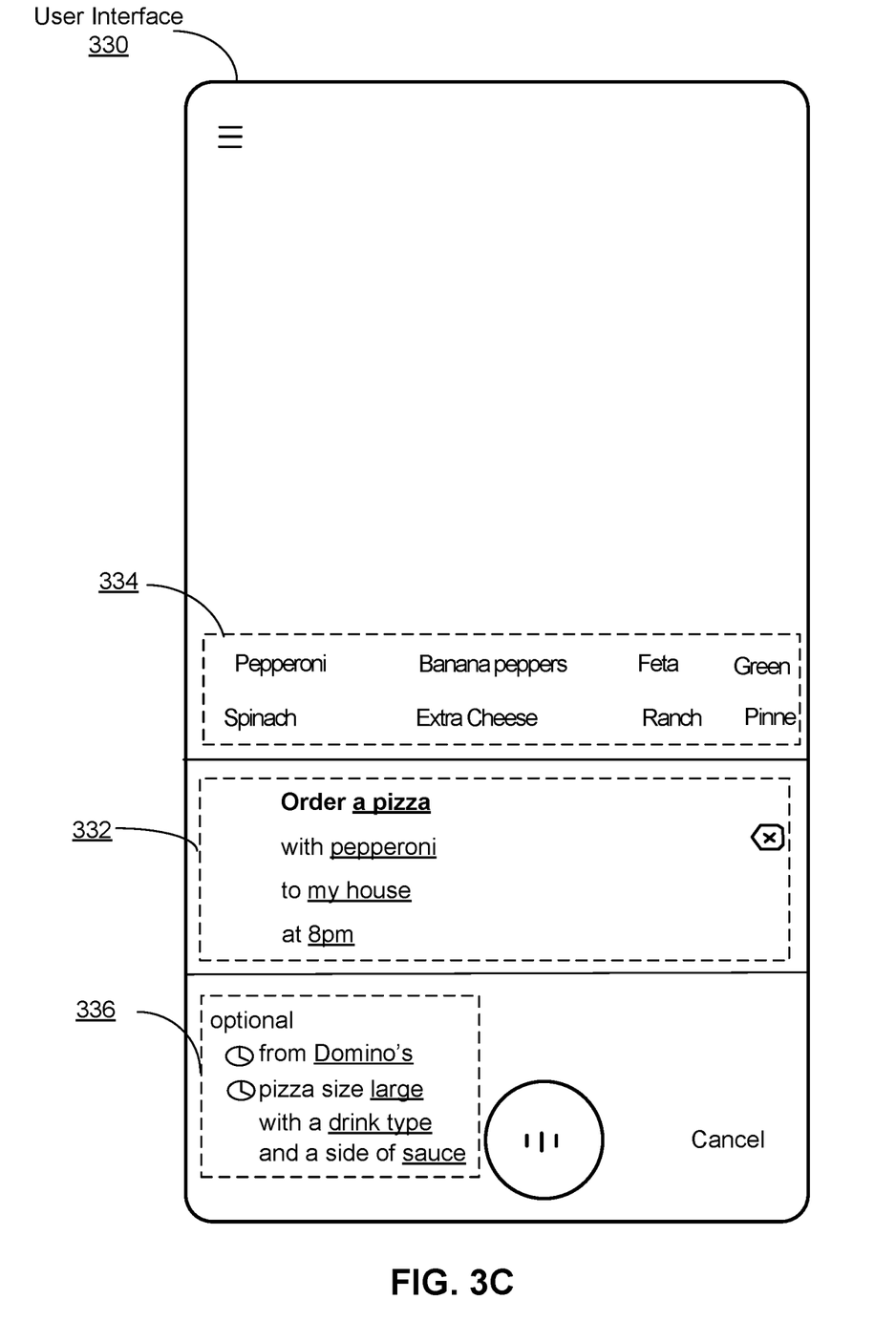
FIG. 3C illustrates a third layout displayed for an interface, in accordance with an example embodiment.

FIG. 3C illustrates a third layout displayed for an interface 330 associated with a pizza-ordering action, in accordance with an example embodiment. Upon reviewing the displayed interface, the user may modify one or more of the placeholder texts with subsequent user input. For example, as shown in FIG. 3C, the computing system 130 may detect that the user interacts with the one or more interface elements in the interface 330. Particularly, the user selects suggestive text (e.g., "pepperoni") that corresponds to the command category of "toppings," indicating that the user intends to modify the toppings of the to-be-ordered pizza. The computing system 130 may generate a set of suggestive text corresponding to the command category of "toppings," and the generated suggestive text may be presented in an interface element 334 in the user interface 330. The user may use the suggestive text displayed in the interface element 334 to select, modify, add, and/or remove the placeholder text of the corresponding command category. In addition to displaying suggestive text, the interface element 334 may include a calendar interface for selecting a date, may show a clock interface for selecting a time, may include images to select between (such as images of pizza toppings), or may include any other interface element to provide a guidance for the user.

Figure 3D:
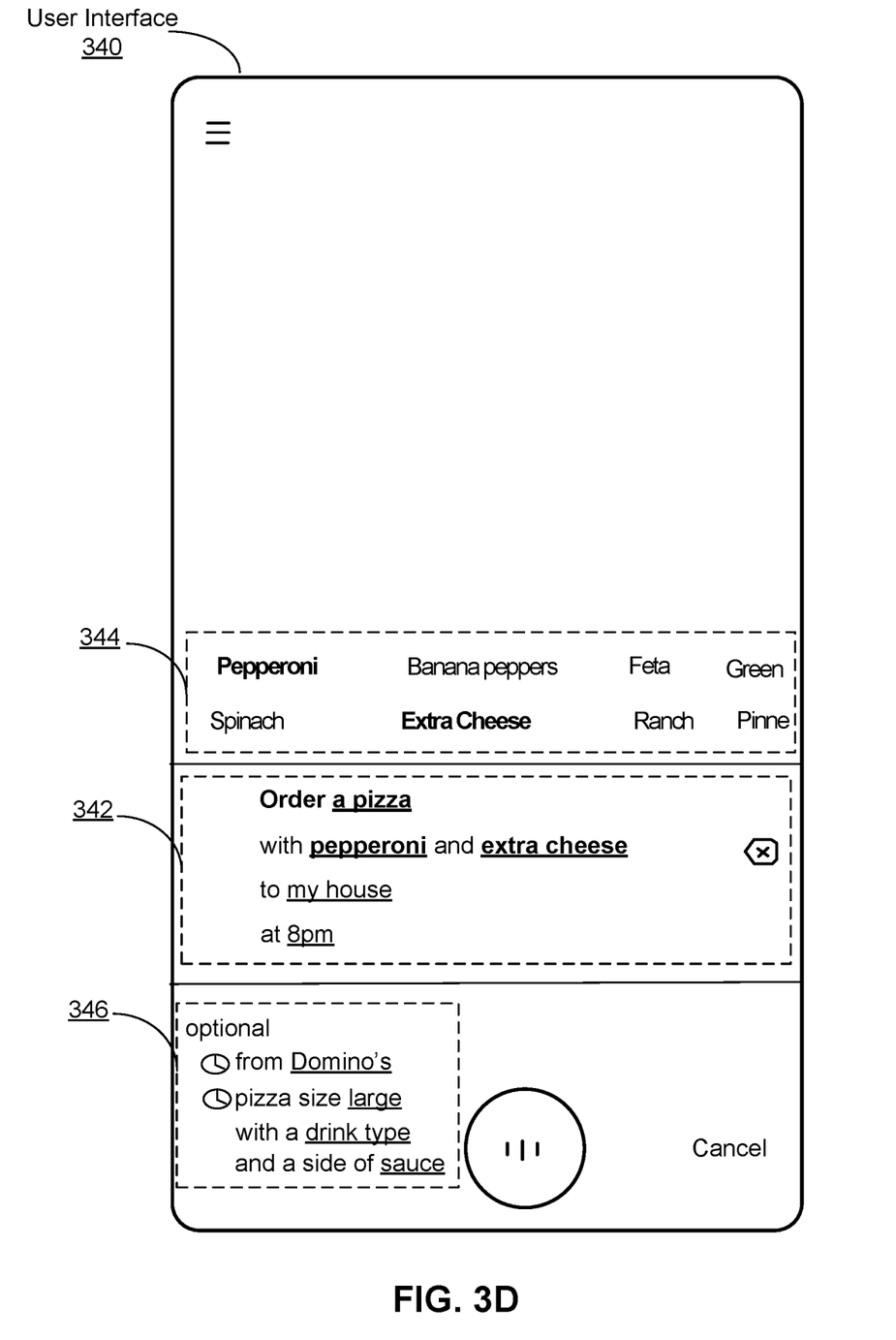
FIG. 3D illustrates a fourth layout displayed for an interface, in accordance with an example embodiment.

FIG. 3D illustrates a fourth layout displayed for an interface 340 associated with a pizza-ordering action, in accordance with an example embodiment. In FIG. 3D, the computing system 130 receives additional user input. In particular, the user input has added additional information, i.e., "extra cheese." The computing system 130 determines the additional user input corresponds to the command category of "toppings." Accordingly, the user interface changes from the layout 330 shown in FIG. 3C to the layout 340 shown in FIG. 3D. For example, FIG. 3D shows an interface element 342 and an interface element 344 that highlights placeholder text approved/confirmed/selected by the user in bold.

The examples of FIGS. 3A to 3D beneficially reflect changing user interfaces that change via a substantially (or almost) simultaneous refresh as a received user input is gradually augmented with additional information. The digital interface described herein guides a user of what to say in real-time, with a continuously reinforcing framework (loop) of education and feedback techniques. The digital interface recognizes and understands the user input (e.g., text input, voice command, etc.), and provides an interface for guiding the user on the subsequent input. In this way, the digital interface receives an entire set of instructions from the user before performing the action required by the user so that the digital interface does not perform an inapplicable task for the user, resulting in i) fewer back and forth clarifying questions, and ultimately ii) a higher success rate.

Figure 4:
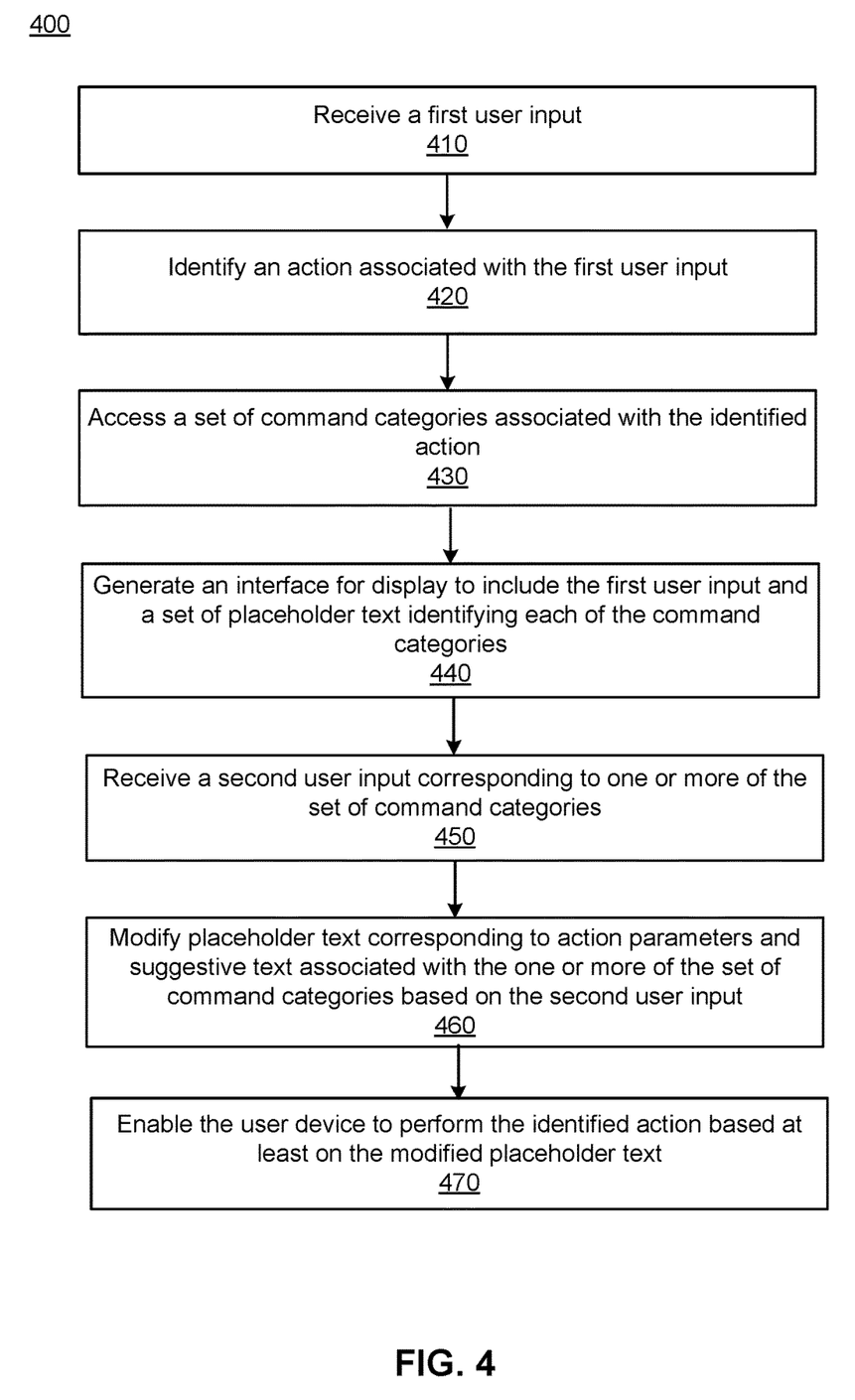
FIG. 4 is a flowchart illustrating an example process of using a digital interface with user input guidance, in accordance with an example embodiment.

FIG. 4 is a flowchart illustrating an example process 400 of using a digital interface with user input guidance, in accordance with an example embodiment. The computing system 130 receives 410 a user input from a client device 110. The user input may be, for example, a word or words at the start of a sentence and may be received by the computing system 130 in a variety of input forms including as text or spoken input. In one example, the user input includes a voice command. The computing system 130 may process the user input to generate signals for action recognition and for identifying command categories. In some embodiments, the computing system 130 applies automatic speech recognition or other type of speech models to produce an input string that represents the input, e.g., as text. In some embodiments, the computing system 130 NLP signals based on the received the user input.

The computing system 130 identifies 420 an action associated with the first user input. In some embodiments, the computing system 130 may directly extract one or more words included in the processed user input for identifying the action. In some embodiments, the computing system 130 uses text classification to identify an action that is most likely to correspond to the user input. In some embodiments, the computing system 130 applies a trained computer model to predict which action is most applicable to responding to the user input. That is, the computing system 130 selects an action that is implied by the received user input.

The computing system 130 accesses 430 a set of command categories associated with the identified action. Each command category represents a characteristic of the identified action. In some embodiments, the set of command categories may include required command categories and optional command categories. In some embodiments, the computing system 130 uses the processed user input and the identified action from the action recognition module 140 as input, and outputs the set of command categories. The computing system 130 may also access an action module store and an education model store to use the interface associated with the identified action as an input, thus obtaining the set of command categories that will be needed for the computing system 130 to perform the action. In some embodiments, one or more associated command categories may be extracted from the set of words identified from the processed user input. The extracted words may be associated with one or more pre-defined command categories. In some embodiments, the computing system 130 uses an action model to provide a set of command categories that are associated with the identified action. The action model may output a set of command categories that are most likely to be associated with an identified action. In some embodiments, the computing system 130 may identify the command categories for a given action based on user history. In particular, one or more optional command categories may be included or removed from the set of command categories associated with an action based on pervious user actions.

The computing system 130 generates 440 an interface for display on the client device. The interface may include the user input and a set of placeholder text identifying each of the command categories. The set of placeholder text corresponding to the command categories provides a guidance to the user on the characteristics of the identified action so that the user learns whether/what additional user input is needed to perform the action. In some embodiments, the computing system 130 may determine the placeholder text based on the processed user input; and in some embodiments, the computing system 130 may determine the set of placeholder text using a machine learned model to predict text that is most likely to be input by the user.

In one implementation, each placeholder text corresponding to each command category may be presented in a separate line. In another implementation, the identified action and/or placeholder text that are input/accepted/selected by the user may be highlighted in different font, color, bold, etc. In still another implementation, the placeholder text and/or the identified action may be underlined so as to notify the user that the corresponding text is modifiable. The interface may include an interface element to highlight the identified action to be performed. The interface may also include another interface element for presenting placeholder text corresponding the optional command categories. For example, the interface may include more than one set of placeholder text for some command categories as recommendations to the user.

The computing system 130 receives 450 a subsequent user input from the client device 110. In some embodiments, the displayed placeholder text may provide a guidance and/or recommendations to the user so that the user may enter subsequent user input corresponding to one or more of the set of command categories.

The computing system 130 modifies 460 placeholder text corresponding to the one or more of the set of command categories based on the subsequent user input. In some embodiments, the placeholder text may correspond to action parameters and/or suggestive text that are associated with the one or more of the set of command categories. In some embodiments, the subsequent user input may include adding, removing, modifying, and/or selecting any of the placeholder text for each of the corresponding command categories so that the user may refine and customize the identified action for performance. In some embodiments, the user may select any of the placeholder text, create new action item, continue input additional information, or cancel the action.

The computing system 130 enables 470 the client device for performing the identified action based at least on the modified placeholder text. In some embodiments, the computing system 130 may directly cause the client device to execute a computer executable function, for example, adding a schedule in the calendar, making a phone call from a contact list, etc. Alternatively, the computing system 130 may enable an interface for display on the client device, which includes one or more interface elements to perform an operation to carry out the identified action when interacted by the user. For example, the interface may be generated and/or populated with one or more interface elements with executable functions that may be executed and correspond to the identified action.

The steps in the process 400 discussed above can vary across different procedures, including having additional or different steps than those shown, and the steps may occur in different orders. In some embodiments, depending on the user input to the computing system 130, the process 400 may skip, repeat some of the steps, or restart the process from step 410.

Example Computing System

Figure 5:
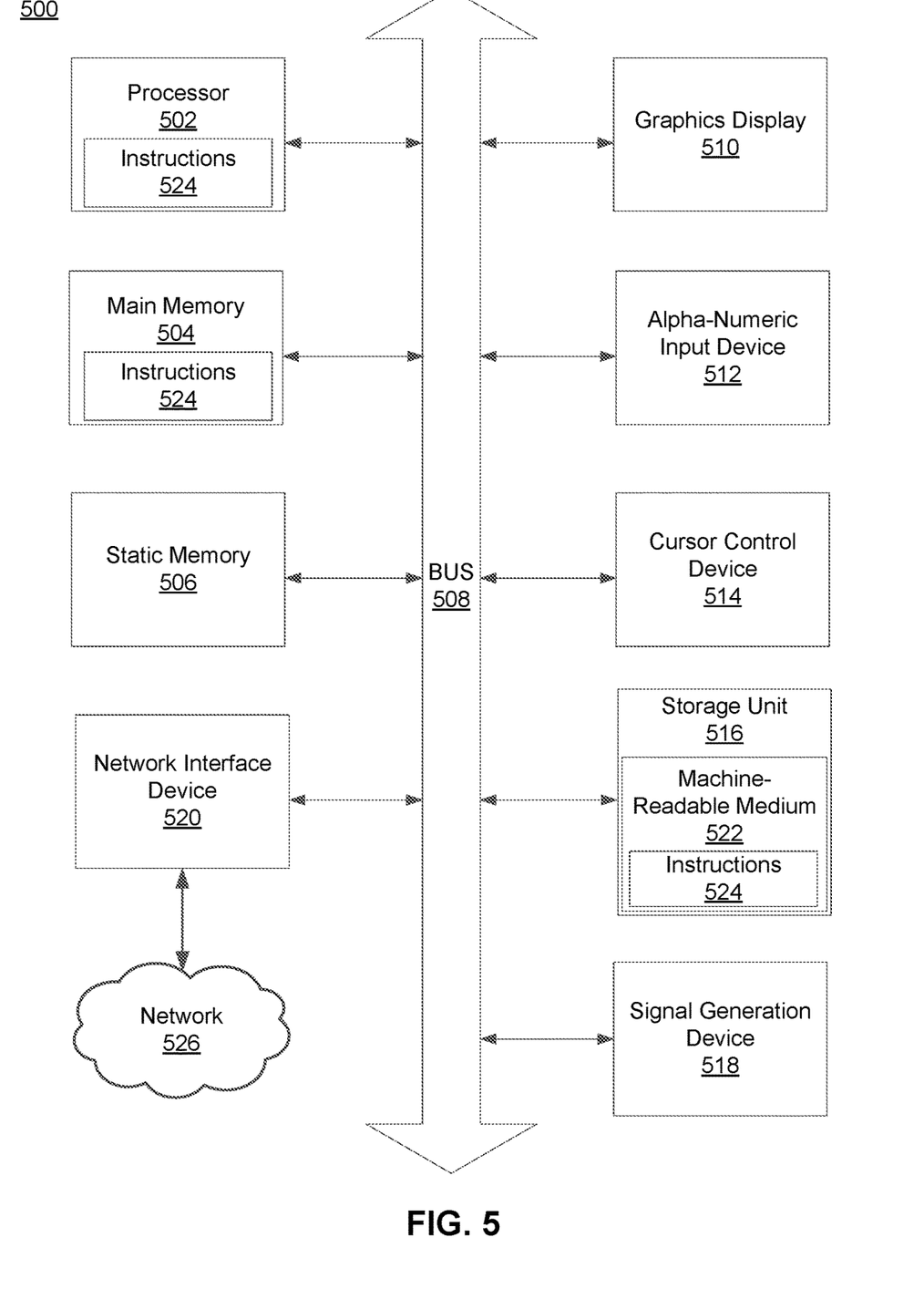
FIG. 5 is a block diagram illustrating components of an example machine able to read instructions from a machine-readable medium and execute them in one or more processors (or controllers), in accordance with an example embodiment.

FIG. 5 is a block diagram illustrating components of an example machine able to read instructions from a machine-readable medium and execute them in one or more processors (or controllers), in accordance with an example embodiment. Specifically, FIG. 5 shows a diagrammatic representation of the computing system 130 in the example form of a computer system 500. The computer system 500 can be used to execute instructions 524 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes one or more processing units (generally processor 502). The processor 502 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The processor executes an operating system for the computing system 500. The computer system 500 also includes a main memory 504. The computer system may include a storage unit 516. The processor 502, memory 504, and the storage unit 516 communicate via a bus 508.

In addition, the computer system 500 can include a static memory 506, a graphics display 510 (e.g., to drive a plasma display panel (PDP), a liquid crystal display (LCD), or a projector). The computer system 500 may also include alphanumeric input device 512 (e.g., a keyboard), a cursor control device 514 (e.g., a mouse, a trackball, a joystick, a motion sensor, or other pointing instrument), a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. For example, the instructions 524 may include instructions for implementing the functionalities of the input processing module 135, the function matching module 140 and/or the command category module 145. The instructions 524 may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 may be transmitted or received over a network 526, such as the network 120, via the network interface device 520. Further, for the client device (or user device), the instructions received may be instructions from a server system that enable functions on the client device. For example, how a user interface is to be displayed may include receiving code for how the user interface should be enabled (e.g., rendered) for display based on how that code appropriately interfaces with the operating system of the client device.

While machine-readable medium 522 is shown in an example embodiment to be a single medium, the term "machine-readable medium" should be taken to include a single medium or multiple media (e.g., a centralized or distributed database, or associated caches and servers) able to store the instructions 524. The term "machine-readable medium" shall also be taken to include any medium that is capable of storing instructions 524 for execution by the machine and that cause the machine to perform any one or more of the methodologies disclosed herein. The term "machine-readable medium" includes, but not be limited to, data repositories in the form of solid-state memories, optical media, and magnetic media.

ADDITIONAL CONSIDERATIONS

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by one or more computer processors for performing any or all of the steps, operations, or processes described.

Embodiments may also relate to an apparatus for performing the operations herein. This apparatus may be specially constructed for the required purposes, and/or it may comprise a computing device selectively activated or reconfigured by a computer program stored in the computer. Such a computer program may be stored in a non-transitory, tangible computer readable storage medium, or any type of media suitable for storing electronic instructions, which may be coupled to a computer system bus. For instance, a computing device coupled to a data storage device storing the computer program can correspond to a special-purpose computing device. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method comprising:
   receiving, from a client device, a first user input comprising a voice command;
   identifying an action associated with the first user input;
   accessing a set of command categories associated with the identified action, each command category representing a characteristic of the identified action;
   generating an interface for display on the client device to include the first user input and a set of placeholder text identifying each of the set of command categories;
   receiving, from the client device, a second user input corresponding to one or more of the set of command categories;
   modifying placeholder text corresponding to the one or more of the set of command categories based on the second user input; and
   enabling the client device for performing the identified action based at least on the modified placeholder text.

2. The method of claim 1, wherein identifying an action associated with the first user input comprises: performing a natural language processing operation on the received first user input.

3. The method of claim 2, wherein generating an interface for display on the client device to include the first user input and a set of placeholder text identifying each of the set of command categories comprises:
   identifying a command category corresponding to a processed first user input; and
   determining placeholder text corresponding to the identified command category based on the processed first user input.

4. The method of claim 1, wherein generating an interface for display on the client device to include the first user input and a set of placeholder text identifying each of the set of command categories comprises:
   determining the set of placeholder text using a machine-learned model to predict text that is most likely to inform a user about what to input to replace the set of placeholder text.

5. The method of claim 1, wherein enabling the client device for performing the identified action based at least on the modified placeholder text comprises:
   enabling a second interface for display on the client device, the second interface including an interface element that, when interacted with, performs an operation to carry out the identified action.

6. The method of claim 1, wherein accessing a set of command categories associated with the identified action comprises: determining the set of command categories based on previous user actions.

7. The method of claim 1, wherein modifying placeholder text corresponding to the one or more of the set of command categories based on the second user input comprises:
   removing a command category from the displayed interface based on the second user input.

8. The method of claim 1, wherein generating an interface for display on the client device to include the first user input and a set of placeholder text identifying each of the set of command categories comprises:
   causing the displayed interface to present each placeholder text corresponding to each command category in a separate line.

9. A computer system comprising:
   one or more computer processors; and
   one or more computer-readable mediums storing instructions that, when executed by the one or more computer processors, cause the system to:
   receive, from a client device, a first user input comprising a voice command;
   identify an action associated with the first user input;
   access a set of command categories associated with the identified action, each command category representing a characteristic of the identified action;
   generate an interface for display on the client device to include the first user input and a set of placeholder text identifying each of the set of command categories;
   receive, from the client device, a second user input corresponding to one or more of the set of command categories;
   modify placeholder text corresponding to the one or more of the set of command categories based on the second user input; and
   enable the client device for performing the identified action based at least on the modified placeholder text.

10. The system of claim 9, wherein the instructions to identify an action associated with the first user input comprise: performing a natural language processing operation on the received first user input.

11. The system of claim 10, wherein the instructions to generate an interface for display on the client device to include the first user input and a set of placeholder text identifying each of the set of command categories comprise:
   identifying a command category corresponding to a processed first user input; and
   determining placeholder text corresponding to the identified command category based on the processed first user input.

12. The system of claim 9, wherein the instructions to generate an interface for display on the client device to include the first user input and a set of placeholder text identifying each of the set of command categories comprise:
   determining the set of placeholder text using a machine-learned model to inform a user about what to input to replace the set of placeholder text.

13. The system of claim 9, wherein the instructions to enable the client device for performing the identified action based at least on the modified placeholder text comprise:
   enabling a second interface for display on the client device, the second interface including an interface element that, when interacted with, performs an operation to carry out the identified action.

14. The system of claim 9, wherein the instructions to access a set of command categories associated with the identified action comprise: determining the set of command categories based on previous user actions.

15. The system of claim 9, wherein the instructions to modify placeholder text corresponding to the one or more of the set of command categories based on the second user input comprise:

removing a command category from the displayed interface based on the second user input.

16. The system of claim 9, wherein the instructions to generate an interface for display on the client device to include the first user input and a set of placeholder text identifying each of the set of command categories comprise:
   causing the displayed interface to present each placeholder text corresponding to each command category in a separate line.

17. A non-transitory computer-readable medium comprising stored instructions that when executed by one or more processors of one or more computing devices, cause the one or more computing devices to:
   receive, from a client device, a first user input comprising a voice command;
   identifying an action associated with the first user input;
   access a set of command categories associated with the identified action, each command category representing a characteristic of the identified action;
   generate an interface for display on the client device to include the first user input and a set of placeholder text identifying each of the set of command categories;
   receive, from the client device, a second user input corresponding to one or more of the set of command categories;
   modify placeholder text corresponding to the one or more of the set of command categories based on the second user input; and
   enable the client device for performing the identified action based at least on the modified placeholder text.

18. The non-transitory computer-readable medium of claim 17, wherein the instructions to generate an interface for display on the client device to include the first user input and a set of placeholder text identifying each of the set of command categories comprise:
   identifying a command category corresponding to the first user input; and
   determining placeholder text corresponding to the identified command category based on the first user input.

19. The non-transitory computer-readable medium of claim 17, wherein the instructions to generate an interface for display on the client device to include the first user input and a set of placeholder text identifying each of the set of command categories comprise:
   determining the set of placeholder text using a machine-learned model to predict text that is most likely to inform a user about what to input to replace the set of placeholder text.

20. The non-transitory computer-readable medium of claim 17, wherein the instructions to enable the client device for performing the identified action based at least on the modified placeholder text comprise:
   enabling a second interface for display on the client device, the second interface including an interface element that, when interacted with, performs an operation to carry out the identified action.

* * * * *